United States Patent
Lim et al.

(10) Patent No.: US 10,771,226 B2
(45) Date of Patent: *Sep. 8, 2020

(54) METHOD FOR LIMITING SPURIOUS EMISSION AND USER EQUIPMENT PERFORMING THE METHOD

(71) Applicant: LG Electronics Inc., Seoul (KR)

(72) Inventors: Suhwan Lim, Seoul (KR); Sangwook Lee, Seoul (KR); Jaehyuk Jang, Seoul (KR); Manyoung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/139,653

(22) Filed: Sep. 24, 2018

(65) Prior Publication Data

US 2019/0260555 A1 Aug. 22, 2019

Related U.S. Application Data

(60) Provisional application No. 62/632,359, filed on Feb. 19, 2018.

(30) Foreign Application Priority Data

Apr. 16, 2018 (KR) ........................ 10-2018-0044054

(51) Int. Cl.
| | |
|---|---|
| *H04L 5/00* | (2006.01) |
| *H04J 11/00* | (2006.01) |
| *H04W 72/04* | (2009.01) |
| *H04L 5/14* | (2006.01) |
| *H04W 28/06* | (2009.01) |
| *H04B 15/00* | (2006.01) |

(52) U.S. Cl.
CPC ............ *H04L 5/0066* (2013.01); *H04B 15/00* (2013.01); *H04J 11/003* (2013.01); *H04L 5/0053* (2013.01); *H04L 5/14* (2013.01); *H04W 28/065* (2013.01); *H04W 72/0446* (2013.01); *H04W 72/0453* (2013.01); *H04L 5/001* (2013.01)

(58) Field of Classification Search
None
See application file for complete search history.

(56) References Cited

U.S. PATENT DOCUMENTS

| | | | |
|---|---|---|---|
| 9,265,038 B2* | 2/2016 | Lim | H04W 72/0413 |
| 2013/0039227 A1* | 2/2013 | Ji | H04B 1/0057 370/277 |
| 2015/0271824 A1* | 9/2015 | Zhang | H04W 72/0453 370/329 |

(Continued)

OTHER PUBLICATIONS

United States Notice of Allowance in U.S. Appl. No. 16/354,774, dated May 10, 2019, 8 pages.

*Primary Examiner* — Duc T Duong
(74) *Attorney, Agent, or Firm* — Fish & Richardson P.C.

(57) ABSTRACT

There is provided a method for limiting a spurious emission, the method performed by a user equipment (UE) and comprising: configuring a transceiver of the UE to use an operating band 71; and determining at least one operating band to be protected among a plurality of operating band, wherein if the determined operating band to be protected is an operating band 29, a maximum level of spurious emission is limited to −38 dBm for protecting other UE using the operating band 29.

20 Claims, 18 Drawing Sheets

(56) References Cited

U.S. PATENT DOCUMENTS

| | | | |
|---|---|---|---|
| 2016/0157230 A1* | 6/2016 | Nord | H04L 1/1861 |
| | | | 370/329 |
| 2017/0013581 A1* | 1/2017 | Dai | H04W 72/0453 |
| 2017/0111161 A1* | 4/2017 | Raggio | H04L 43/16 |
| 2018/0175999 A1* | 6/2018 | Yoshimi | H04L 5/1461 |
| 2019/0052294 A1* | 2/2019 | Abdelmonem | H04B 1/1036 |
| 2019/0081649 A1* | 3/2019 | Khlat | H04B 1/0475 |
| 2019/0089452 A1* | 3/2019 | Ashworth | H04B 7/15542 |
| 2019/0132024 A1* | 5/2019 | Zhan | H04B 3/10 |

* cited by examiner (a)

(b)

METHOD FOR LIMITING SPURIOUS EMISSION AND USER EQUIPMENT PERFORMING THE METHOD

CROSS-REFERENCE TO RELATED APPLICATIONS

This application claims the benefit of priority of U.S. Provisional Application No. 62/632,359 filed on Feb. 19, 2018 and Korean Application No. 10-2018-0044054 filed on Apr. 16, 2018, the contents of which are all hereby incorporated by reference herein in their entirety.

BACKGROUND OF THE INVENTION

Field of the Invention

The present invention relates to mobile communication.

Discussion of the Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

According to the International Telecommunication Union (ITU), the fifth generation (5G) mobile communication is defined as a mobile communication technology that provides a maximum data transmission rate of 20 Gbps and a minimum experienced data rate of 100 Mbps or more in any location. The official term is 'IMT-2020', which aims worldwide commercial usage by the year of 2020.

The ITU proposes three major usage scenarios, such as an enhanced Mobile BroadBand (eMBB), a massive Machine Type Communication (mMTC), and an Ultra Reliable and Low Latency Communications (URLLC).

The URLLC relates to a usage scenario requiring high reliability and a low latency time (or delay time). For example, services such as automated driving, factory automation, augmented reality (AR), and so on, require high reliability and a low latency time (e.g., a latency time of 1 ms or less). Statistically, the latency time of the current 4G (LTE) is within the range of 21-43 ms (best 10%) and 33-75 ms (median). This is insufficient for supporting a service that requires a latency time of 1 ms or less. The following eMBB usage scenario corresponds to a usage scenario that requires a mobile ultra-wide band.

More specifically, the 5th generation mobile communication system aims to achieve a capacity that is greater than the current 4G LTE. The 5G mobile communication system is also capable of increasing user density for mobile wideband users and supporting Device to Device (D2D) communication, high stability, and Machine Type Communication (MTC). The 5G research and development also aims to achieve a lower latency time and lower battery power consumption as compared to the 4G mobile communication system in order to successfully implement the Internet of Things (IoT). For such 5G mobile communication, a new radio access technology (New RAT or NR) may be proposed.

In the NR, it may be considered to use a downlink (DL) subframe for the reception from the base station and to use an uplink (UL) subframe for a transmission to the base station. This may be applied to a spectrum that is formed in pairs and to a spectrum that is not formed in pairs. A spectrum pair means that two carrier spectrums are included for the downlink and uplink operations. For example, in a spectrum pair, one carrier may include a downlink band and an uplink band that is paired with the downlink band.

As can be seen from FIG. 1, the wireless communication system includes at least one base station (BS) 20. Each base station 20 offers a communication service in a specific geographical area (generally denoted cell) 20a, 20b, and 20c.

At this time, communication from the base station to a terminal is denoted downlink (DL), and communication from the terminal to the base station is denoted uplink (UL).

If the BSs 20 provided from a plurality of service providers is located at respective geographical regions 15a, 15b, and 15c, the BSs 20 may interfere with each other.

In order to prevent the interference, the respective service providers may provide a service with different frequency bands.

However, when the frequency bands of the respective service providers are close to each other, the interference problem remains.

With regards to the interference problem, UE-to-UE coexistence requirements, which are requirements for aggressor UE to protect victim UE from the aggressor UE's transmission, for a plurality of operating bands were discussed and defined previously. UE-to-UE coexistence requirements for new 600 MHz Band 71 User Equipment (UE) and New Radio (NR) Band n71 UE have been defined before.

However, the requirements do not consider close proximity of frequencies between the uplink frequency of Band 71 (or NR Band n71) and some received frequencies lower 700 MHz frequencies bands such as Band 29 and Band 71. Thus, there is a need to consider the close proximity of frequencies between the uplink frequency of Band 71 (or NR Band n71) and some received frequencies lower 700 MHz frequencies bands and to suggest new UE-to-UE requirements for Band 71 UE and NR Band n71 UE.

SUMMARY OF THE INVENTION

Accordingly, a disclosure of the present specification has been made in an effort to solve the aforementioned problem.

In accordance with an embodiment of the present invention, provided is a method for limiting a spurious emission, the method performed by a user equipment (UE) and comprising: configuring a transceiver of the UE to use an operating band 71; and determining at least one operating band to be protected among a plurality of operating band, wherein if the determined operating band to be protected is an operating band 29, a maximum level of spurious emission is limited to −38 dBm for protecting other UE using the operating band 29.

The operating band 71 includes an uplink operating band of 663 MHz to 698 MHz, and the operating band 29 includes a downlink operating band of 717 MHz to 728 MHz.

The operating band 71 includes a downlink operating band of 617 MHz to 652 MHz.

The operating band 29 is defined for an Evolved UMTS Terrestrial Radio Access (E-UTRA).

The operating band 71 is defined for Evolved UMTS Terrestrial Radio Access (E-UTRA).

the operating band 71 corresponds to operating band n71, which is defined for New Radio (NR)

According to a disclosure of the present invention, the above problem of the related art is solved.

In accordance with an embodiment of the present invention, provided is A User Equipment (UE) limiting a spurious emission, the UE comprising: a transceiver; and a processor operatively connected to the transceiver and configured to: configure a transceiver of the UE to use an operating band 71; and determine at least one band to be protected among a plurality of operating bands, wherein if the determined operating band to be protected is operating band 29, a maximum level of spurious emission is limited to −38 dBm for protecting other UE using the operating band 29.

The operating band 71 includes an uplink operating band of 663 MHz to 698 MHz, and wherein the operating band 29 includes a downlink operating band of 717 MHz to 728 MHz.

The operating band 71 includes a downlink operating band of 617 MHz to 652 MHz.

The operating band 29 is defined for an Evolved UMTS Terrestrial Radio Access (E-UTRA).

The operating band 71 is defined for Evolved UMTS Terrestrial Radio Access (E-UTRA).

The band 71 corresponds to operating band n71, which is defined for New Radio (NR).

According to a disclosure of the present invention, the above problem of the related art is solved.

DETAILED DESCRIPTION OF THE EMBODIMENTS

Figure 1:
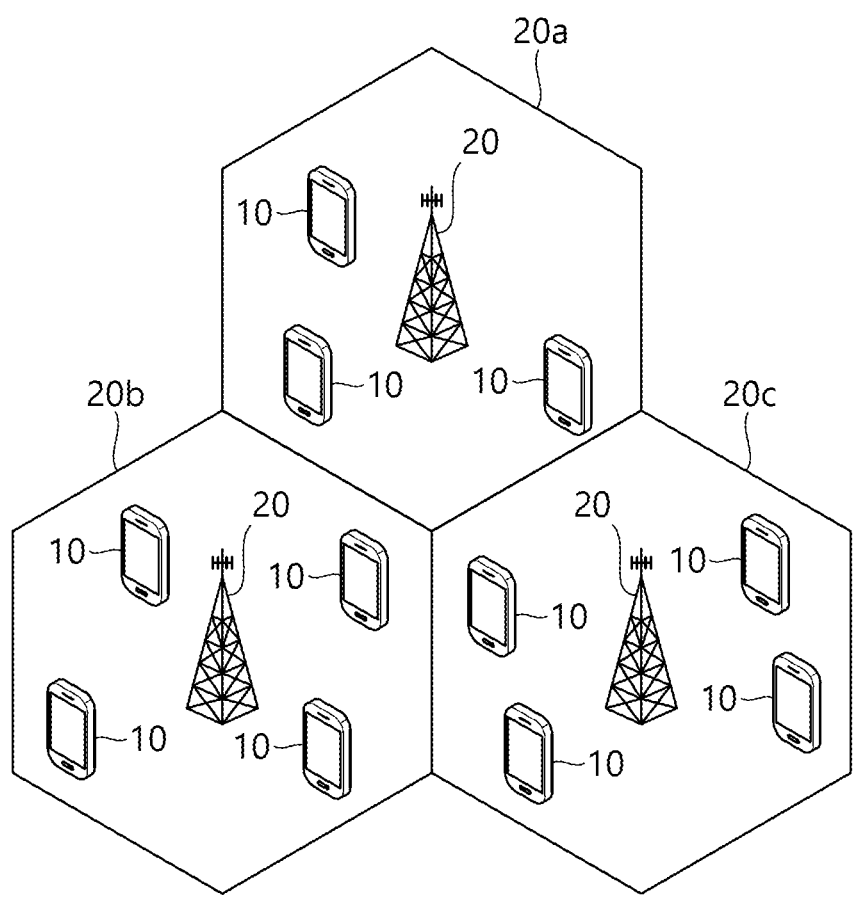
FIG. 1 illustrates a wireless communication system.

Hereinafter, based on 3rd Generation Partnership Project (3GPP) long term evolution (LTE), 3GPP LTE-advanced (LTE-A), or 3GPP New Radio (NR), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
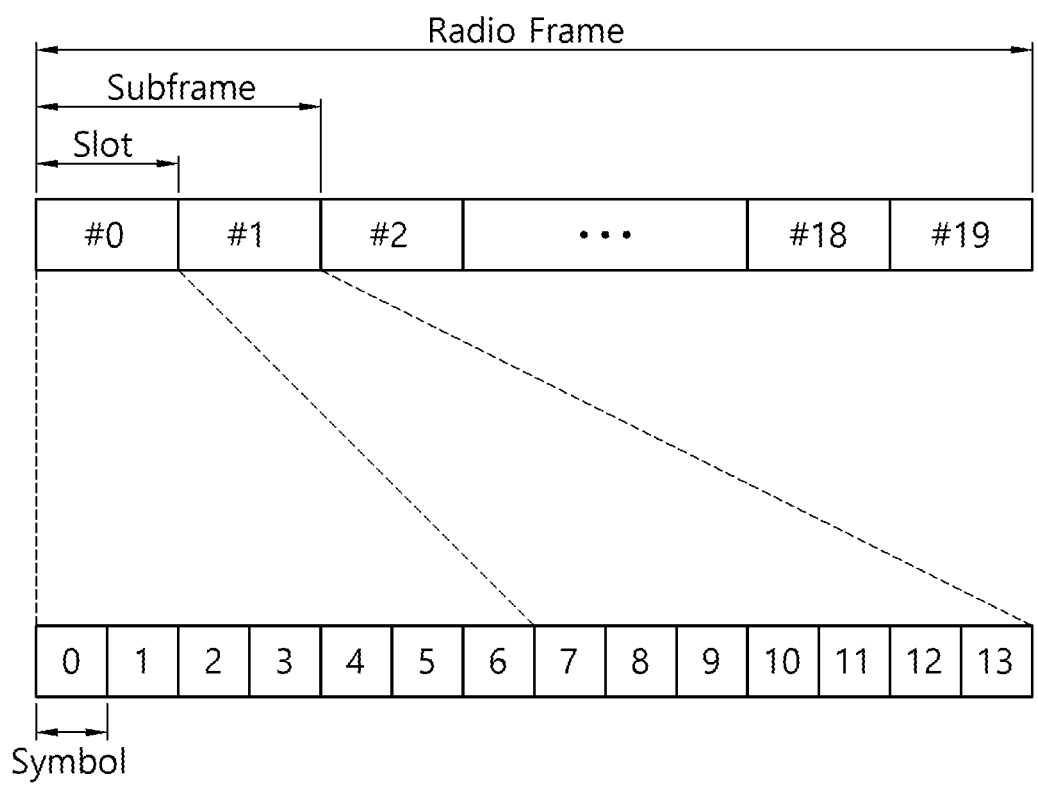
FIG. 2 illustrates the architecture of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-December) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

One slot includes NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

Figure 3:
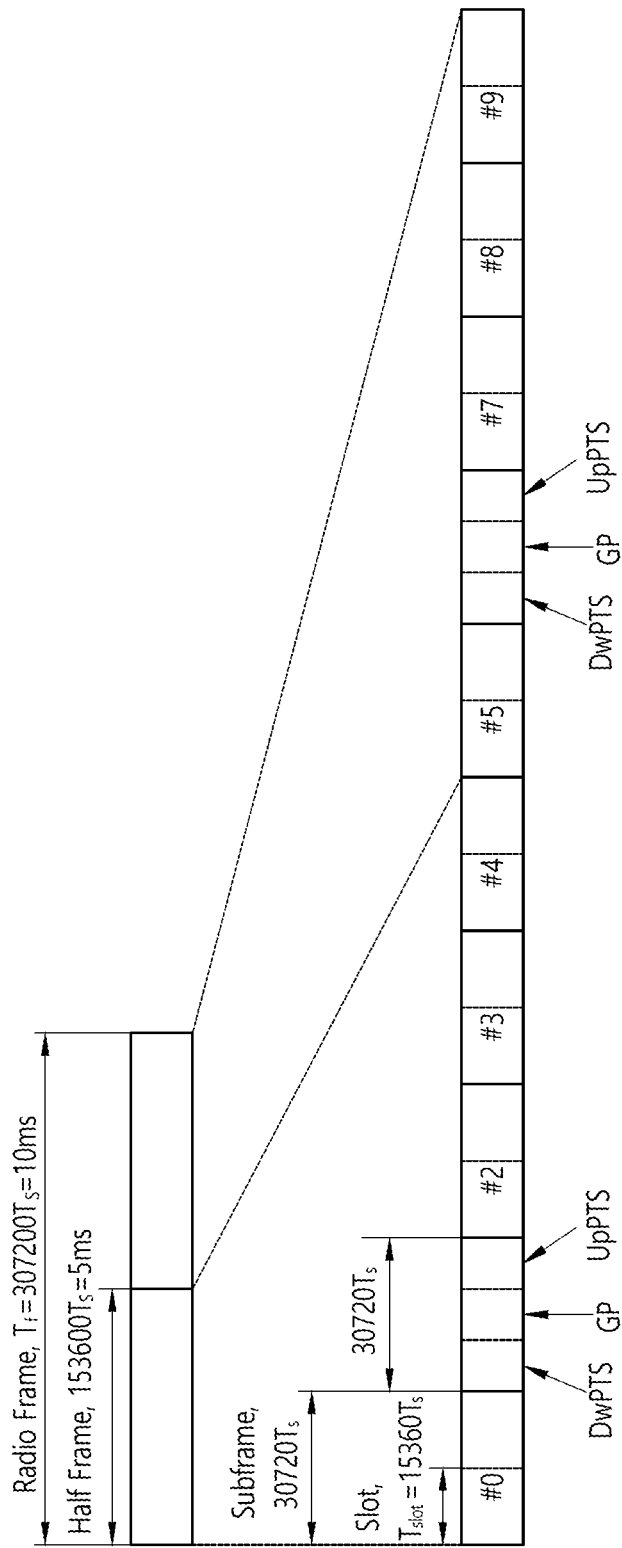
FIG. 3 illustrates the architecture of a downlink radio frame according to TDD in 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

Figure 4:
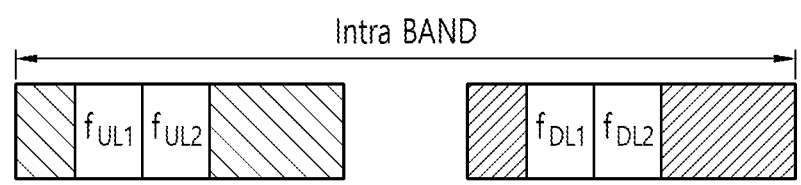
FIG. 4 is a concept view illustrating intra-band carrier aggregation (CA).
Figure 4:
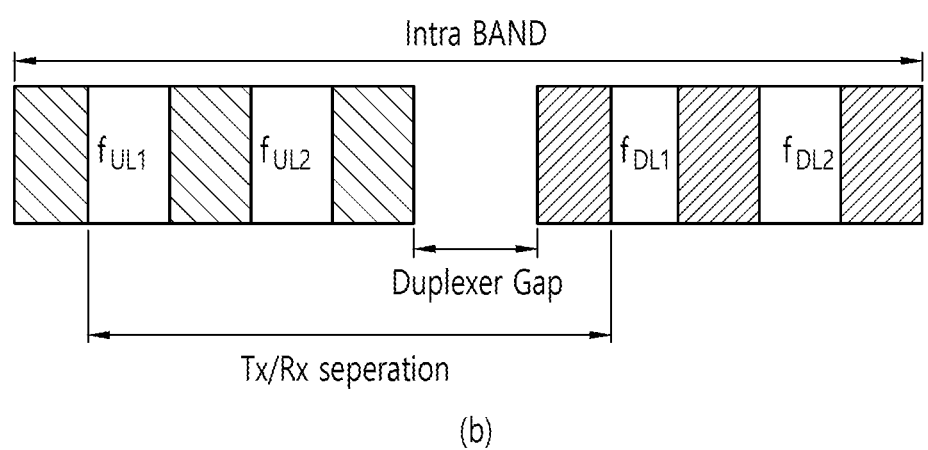

FIG. 4 is a concept view illustrating intra-band carrier aggregation (CA).

FIG. 4(a) illustrates intra-band contiguous CA, and FIG. 4(b) illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 4(a) and the intra-band non-contiguous CA shown in FIG. 4(b).

Figure 5:
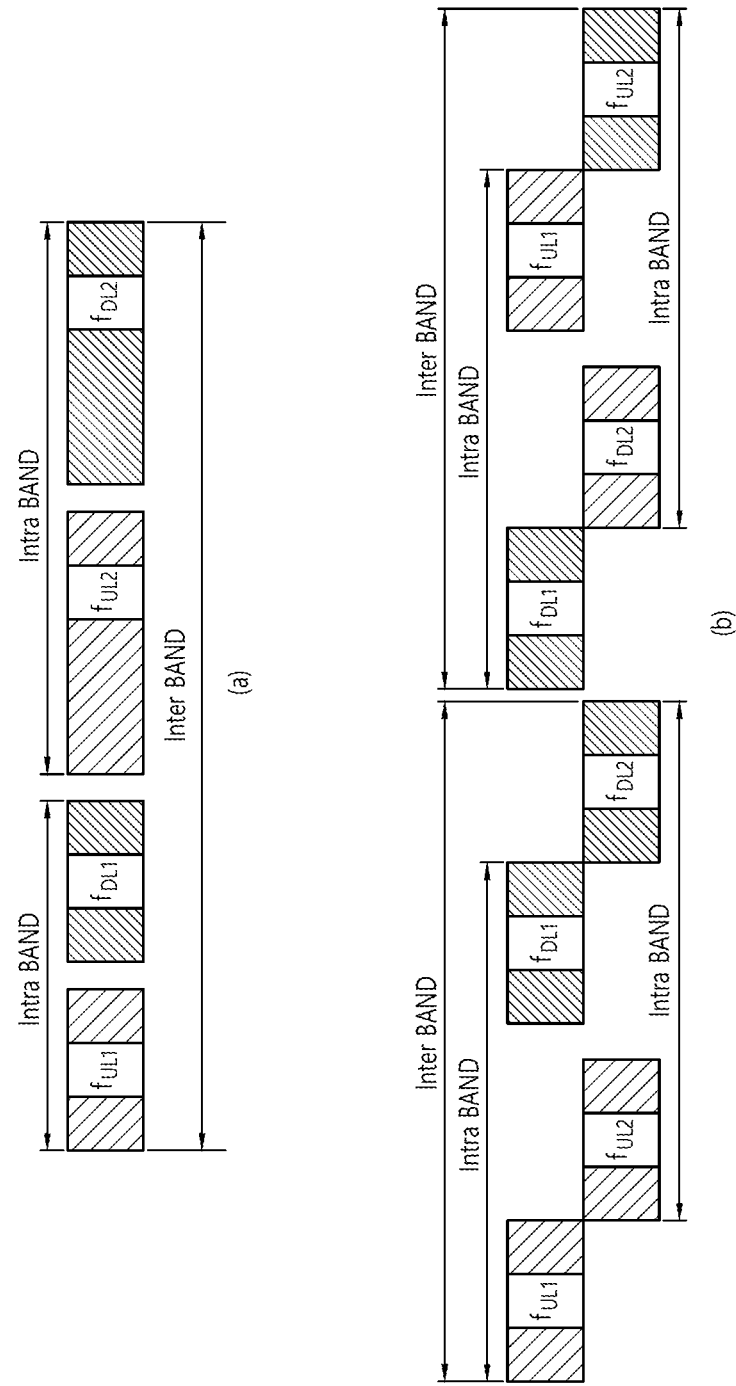
FIG. 5 is a concept view illustrating inter-band carrier aggregation.

FIG. 5 is a concept view illustrating inter-band carrier aggregation.

FIG. 5(a) illustrates a combination of a lower band and a higher band for inter-band CA, and FIG. 5(b) illustrates a combination of similar frequency bands for inter-band CA.

In other words, the inter-band carrier aggregation may be separated into inter-band CA between carriers of a low band and a high band having different RF characteristics of inter-band CA as shown in FIG. 5(a) and inter-band CA of similar frequencies that may use a common RF terminal per component carrier due to similar RF (radio frequency) characteristics as shown in FIG. 5(b).

TABLE 2

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |

TABLE 2-continued

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

Meanwhile, the 3GPP LTE/LTE-A systems define operating bands for uplink and downlink as shown in Table 2 above. Four CA cases shown in FIG. 5 come from Table 2.

Here, $F_{UL\_low}$ means the lowest frequency in the uplink operating bands. $F_{UL\_high}$ means the highest frequency in the uplink operating bands. Further, $F_{DL\_low}$ means the lowest frequency in the downlink operating bands, and $F_{DL\_high}$ means the highest frequency in the downlink operating bands.

When the operating bands are defined as shown in Table 2, each nation's frequency distributing organization may assign specific frequencies to service providers in compliance with the nation's circumstances.

Meanwhile, CA bandwidth classes and their corresponding guard bands are as shown in the following table.

TABLE 3

| CA Bandwidth Class | Aggregated Transmission Bandwidth Configuration | Maximum number of CCs | Nominal Guard Band BWGB |
|---|---|---|---|
| A | $N_{RB,\ agg} \leq 100$ | 1 | $0.05 BW_{Channel(1)}$ |
| B | $N_{RB,\ agg} \leq 100$ | 2 | FFS |
| C | $100 < N_{RB,\ agg} \leq 200$ | 2 | $0.05\ max(BW_{Channel(1)}, BW_{Channel(2)})$ |
| D | $200 < N_{RB,\ agg} \leq [300]$ | FFS | FFS |
| E | $[300] < N_{RB,\ agg} \leq [400]$ | FFS | FFS |
| F | $[400] < N_{RB,\ agg} \leq [500]$ | FFS | FFS |

In the above table, the brackets [ ] represent that the value therebetween is not completely determined and may be varied. FFS stands for 'For Further Study.' $N_{RB\_agg}$ is the number of RBs aggregated in an aggregation channel band.

Table 4 below shows bandwidth sets respective corresponding to CA configurations.

TABLE 4

| | E-UTRA CA configuration/Bandwidth combination set | | | | | |
|---|---|---|---|---|---|---|
| E-UTRA CA configuration | 50 RB + 100 RB (10 MHz + 20 MHz) | 75 RB + 75 RB (15 MHz + 15 MHz) | 75 RB + 100 RB (15 MHz + 20 MHz) | 100 RB + 100 RB (20 MHz + 20 MHz) | Maximum aggregated bandwidth [MHz] | Bandwidth Combination Set |
| CA_1C | | Yes | | Yes | 40 | 0 |
| CA_7C | | Yes | | Yes | 40 | 0 |
| CA_38C | | Yes | | Yes | 40 | 0 |
| CA_40C | Yes | Yes | | Yes | 40 | 0 |
| CA_41C | Yes | Yes | Yes | Yes | 40 | 0 |

In the above table, CA configuration represents an operating bandwidth and CA bandwidth class. For example, CA_1C means operating band 2 in Table 2 and CA band class C in Table 3. All of the CA operating classes may apply to bands that are not shown in the above table.

Figure 6:
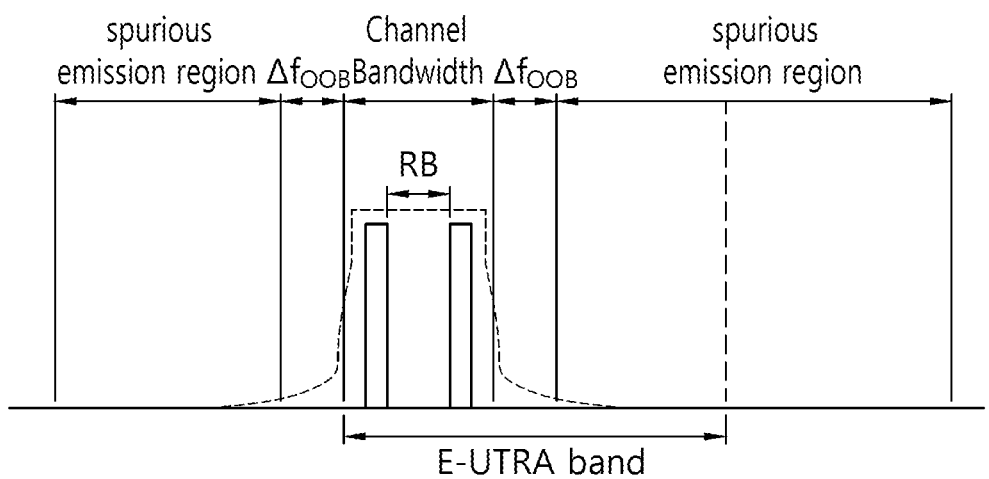
FIG. 6 illustrates the concept of unwanted emission.
Figure 7:
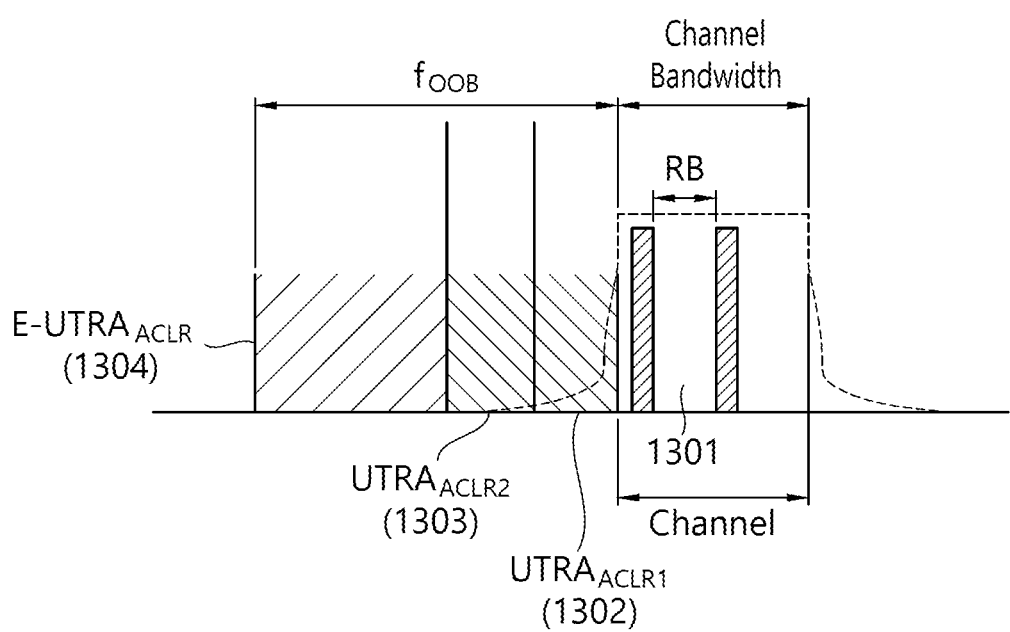
FIG. 7 specifically illustrates out-of-band emission of the unwanted emission shown in FIG. 6.
Figure 8:
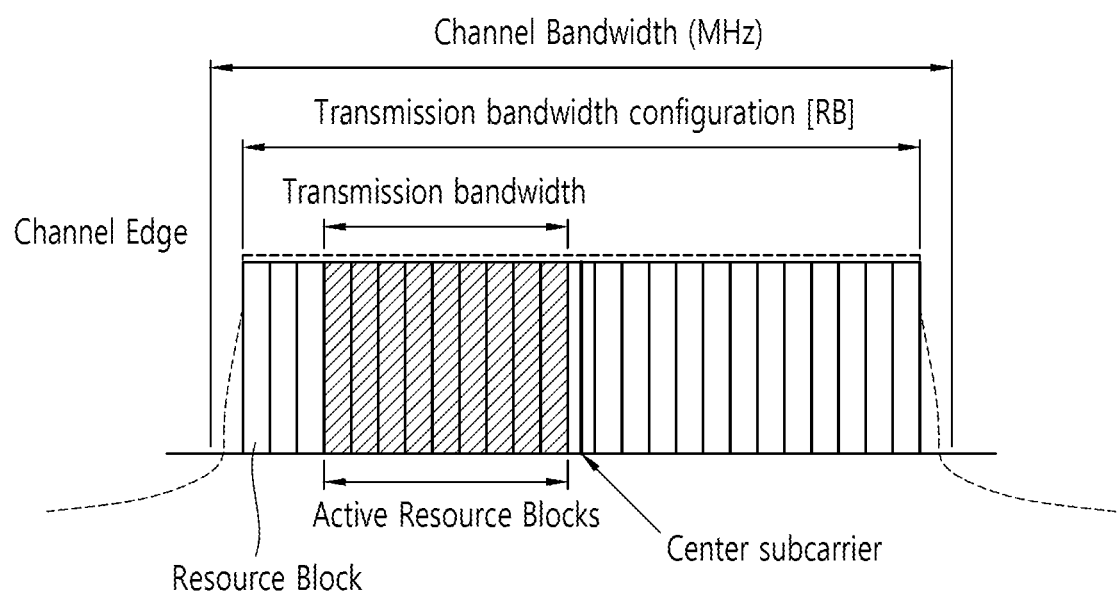
FIG. 8 illustrates a relationship between the resource block RB and channel band (MHz) shown in FIG. 6.

FIG. 6 illustrates the concept of unwanted emission. FIG. 7 specifically illustrates out-of-band emission of the unwanted emission shown in FIG. 6. FIG. 8 illustrates a relationship between the resource block RB and channel band (MHz) shown in FIG. 6.

As can be seen from FIG. 6, a transmission modem sends a signal over a channel bandwidth assigned in an E-UTRA band.

Here, the channel bandwidth is defined as can be seen from FIG. 8. That is, a transmission bandwidth is set to be smaller than the channel bandwidth ($BW_{Channel}$). The transmission bandwidth is set by a plurality of resource blocks (RBs). The outer edges of the channel are the highest and lowest frequencies that are separated by the channel bandwidth.

Meanwhile, as described above, the 3GPP LTE system supports channel bandwidths of 1.4 MHz, 3 MHz, 5 MHz, 10 MHz, 15 MHz, and 20 MHz. The relationship between such channel bandwidths and the number of resource blocks is as below.

TABLE 5

| Channel bandwidth $BW_{Channel}$ [MHz] | 1.4 | 3 | 5 | 10 | 15 | 20 |
|---|---|---|---|---|---|---|
| Transmission bandwidth settings NRB | 6 | 15 | 25 | 50 | 75 | 100 |

Turning back to FIG. 6, unwanted emission arises in the band of $\Delta f_{OOB}$, and as shown, unwanted emission also occurs on the spurious area. Here, $\Delta f_{OOB}$ means the magnitude in the out-of-band (OOB). Meanwhile, the out-of-band omission refers to the one that arises in a band close to an intended transmission band. The spurious emission means that unwanted waves spread up to a frequency band that is far away from the intended transmission band.

Meanwhile, 3GPP release 10 defines basic SE (spurious emission) that should not be exceeded according to a frequency range.

In the meantime, as illustrated in FIG. 7, if transmission is conducted in the E-UTRA channel band 1301, leakage, i.e., unwanted emission, occurs to out-of-bands (1302, 1303, and 1304 in the shown fops area).

Here, UTRA$_{ACLR1}$ denotes a ratio of leakage to a channel 1302 to an E-UTRA channel 1301, i.e., an adjacent channel leakage ratio, in case the adjacent channel 1302 is the one for UTRA when a terminal conducts transmission on the E-UTRA channel 1301. UTRA$_{ACLR2}$ is a ratio of leakage to a channel 1303 (a UTRA channel) located to the adjacent channel 1302, i.e., an adjacent channel leakage ratio, in case the channel 1303 is the one for UTRA, as shown in FIG. 7. E-UTRA$_{ACLR}$ is a ratio of leakage to an adjacent channel 1304 (i.e., an E-UTRA channel) when the terminal conducts transmission through the E-UTRA channel 1301, i.e., an adjacent channel leakage ratio.

As set forth above, if transmission is conducted in an assigned channel band, unwanted emission occurs to adjacent channels.

As described above, unwanted emission arises to bands adjacent to each other. At this time, with respect to interference caused by transmission from the base station, the amount of interference to adjacent bands may be reduced to an allowed reference or less by designing a high-price and bulky RF filter in view of the base station's nature. On the contrary, in the case of the terminal, it is difficult to completely prevent interference to adjacent bands due to, e.g., the limited size of terminal and limited price of the power amplifier or pre-duplex filter RF device.

Accordingly, the terminal's transmission power needs to be limited.

In the LTE system, a maximum power Pcmax in the UE is simply expressed as follows.

Pcmax=Min(Pemax,Pumax)  [Equation 1]

Where, the Pcmax represents maximum power (actual maximum transmission power) where the UE may transmit in a corresponding cell, and the Pemax represents usable maximum power in a corresponding cell to which the BS signals. Further, the Pumax represents maximum power of the UE on which Maximum Power Reduction (hereinafter referred to as "MPR") and Additive-MPR (hereinafter referred to as "A-MPR") are considered.

The maximum power P$_{PowerClass}$ of the UE is listed in a following table 6.

TABLE 6

| Operating band | Power class 1 (dBm) | Power class 3 (dBm) |
|---|---|---|
| 1, 2, 3, 4, 5, 6, 7, 8, 9, 10, 11, 12, 13, 14, 17, 18, 18, 19, 20, 21, 22, 23, 24, 25, 26, | | 23 dBm |

TABLE 6-continued

| Operating band | Power class 1 (dBm) | Power class 3 (dBm) |
|---|---|---|
| 27, 28, 30, 31, 33, 34, 35, 36, 37, 38, 39, 40, 41, 42, 43, 44 | | |
| 14 | 31 dBm | |

Meanwhile, in a case of intra-band continuous CA. maximum power PPowerClass of the UE is listed in a following table 7.

TABLE 7

| Operating Band | Power class 3 (dBm) |
|---|---|
| CA_1C | 23 dBm |
| CA_3C | 23 dBm |
| CA_7C | 23 dBm |
| CA_38C | 23 dBm |
| CA_40C | 23 dBm |
| CA_41C | 23 dBm |

Figure 9:
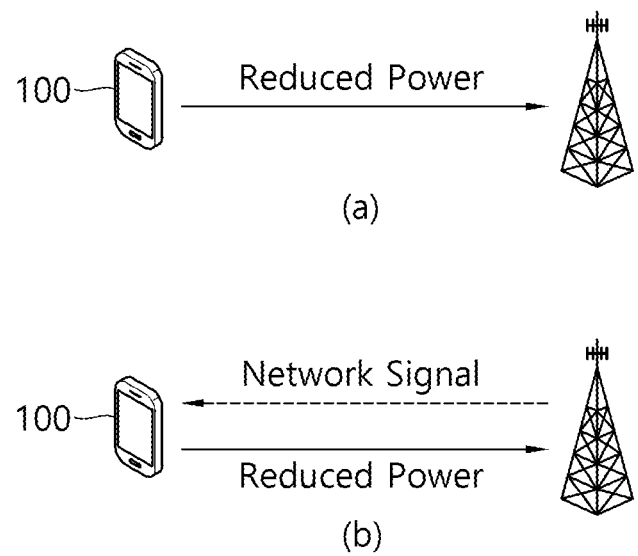
FIG. 9 illustrates an example of a method of limiting transmission power of a terminal.

FIG. 9 illustrates an example of a method of limiting transmission power of a terminal.

As can be seen from FIG. 9(a), the terminal 100 conducts transmission with transmission power limited In case a PAPR (peak-to-average power ratio) is increased, linearity of the power amplifier (PA) is reduced, as an MPR (maximum power reduction) value for limiting transmission power, an MPR value up to 2 dB may apply depending on modulation schemes in order to maintain such linearity. This is shown in the following table.

TABLE 8

| | Channel bandwidth/Transmission bandwidth (NRB) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

Table 6 above represents MPR values for power classes 1 and 3.

<General MPR>

Taking the CA into account, the channel bandwidth of uplink, meanwhile, may be increased up to 40 MHz (20 MH+20 MHz), and accordingly, a larger MPR value is needed.

TABLE 9

| | CA bandwidth Class C | | | | |
|---|---|---|---|---|---|
| Modulation | 50 RB + 100 RB | 75 RB + 75 RB | 75 RB + 100 RB | 100 RB + 100 RB | MPR (dB) |
| QPSK | >12 and ≤50 | >16 and ≤75 | >16 and ≤75 | >18 and ≤100 | ≤1 |
| QPSK | >50 | >75 | >75 | >100 | ≤2 |
| 16 QAM | ≤12 | ≤16 | ≤16 | ≤18 | ≤1 |

TABLE 9-continued

| | CA bandwidth Class C | | | | |
|---|---|---|---|---|---|
| Modulation | 50 RB + 100 RB | 75 RB + 75 RB | 75 RB + 100 RB | 100 RB + 100 RB | MPR (dB) |
| 16 QAM | >12 and ≤50 | >16 and ≤75 | >16 and ≤75 | >18 and ≤100 | ≤2 |
| 16 QAM | >50 | >75 | >75 | >100 | ≤3 |

Table 9 above represents MPR values for power class 3.

As in Table 9, in the case of class C of intra contiguous CA, an MPR value up to 3 dB may apply depending on modulation schemes.

As can be seen from FIG. 9(*b*), the base station may apply A-MPR (additional maximum power reduction) by transmitting a network signal (NS) to the terminal 100. The A-MPR, unlike the above-mentioned MPR, is that the base station transmits the network signal (NS) to the terminal 100 operating at a specific operating band so that the terminal 100 conducts additional power reduction in order not to affect adjacent bands, for example, not to give interference to the adjacent bands. That is, if a terminal applied with MPR receives a network signal (NS), A-MPR is additionally applied to determine transmission power.

The following table represents A-MPR values per network signal.

TABLE 10

| Network Signaling value | Channel bandwidth (MHz) | Resources Blocks (NRB) | A-MPR (dB) |
|---|---|---|---|
| NS_01 | 1.4, 3, 5, 10, 15, 20 | | Not defined |
| NS_03 | 3 | >5 | ≤1 |
| | 5 | >6 | ≤1 |
| | 10 | >6 | ≤1 |
| | 15 | >8 | ≤1 |
| | 20 | >10 | ≤1 |
| NS_04 | 5 | >6 | ≤1 |
| NS_05 | 10, 15, 20 | ≥50 | ≤1 |
| NS_06 | 1.4, 3, 5, 10 | — | Not defined |
| NS_07 | 10 | Shown in Table 9 | |
| NS_08 | 10, 15 | >44 | ≤3 |
| NS_09 | 10, 15 | >40 | ≤1 |
| | | >55 | ≤2 |
| NS_18 | 5 | >2 | ≤1 |
| | 10, 15, 20 | ≥1 | ≤4 |

<A-MPR per CA>

On the other hands, taking CA into consideration, the channel bandwidth of uplink may be increased up to 40 MHz (20 MHz+20 MHz), and accordingly, a larger MPR value is needed. Thus, in case the base station transmits a network signal to the terminal to protect a specific band in the CA environment, additional power reduction is conducted in the terminal operating at the specific band, thereby protecting adjacent bands.

<Next Generation Mobile Networks>

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

According to the International Telecommunication Union (ITU), the fifth generation (5G) mobile communication is defined as a mobile communication technology that provides a maximum data transmission rate of 20 Gbps and a minimum experienced data rate of 100 Mbps or more in any location. The official term is 'IMT-2020', which aims worldwide commercial usage by the year of 2020.

The ITU proposes three major usage scenarios, such as an enhanced Mobile BroadBand (eMBB), a massive Machine Type Communication (mMTC), and an Ultra Reliable and Low Latency Communications (URLLC).

The URLLC relates to a usage scenario requiring high reliability and a low latency time (or delay time). For example, services such as automated driving, factory automation, augmented reality (AR), and so on, require high reliability and a low latency time (e.g., a latency time of 1 ms or less). Statistically, the latency time of the current 4G (LTE) is within the range of 21-43 ms (best 10%) and 33-75 ms (median). This is insufficient for supporting a service that requires a latency time of 1 ms or less. The following eMBB usage scenario corresponds to a usage scenario that requires a mobile ultra-wide band.

More specifically, the 5th generation mobile communication system aims to achieve a capacity that is greater than the current 4G LTE. The 5G mobile communication system is also capable of increasing user density for mobile wideband users and supporting Device to Device (D2D) communication, high stability, and Machine Type Communication (MTC). The 5G research and development also aims to achieve a lower latency time and lower battery power consumption as compared to the 4G mobile communication system in order to successfully implement the Internet of Things (IoT). For such 5G mobile communication, a new radio access technology (New RAT or NR) may be proposed.

In the NR, it may be considered to use a downlink (DL) subframe for the reception from the base station and to use an uplink (UL) subframe for a transmission to the base station. This may be applied to a spectrum that is formed in pairs and to a spectrum that is not formed in pairs. A spectrum pair means that two carrier spectrums are included for the downlink and uplink operations. For example, in a spectrum pair, one carrier may include a downlink band and an uplink band that is paired with the downlink band.

Figure 10:
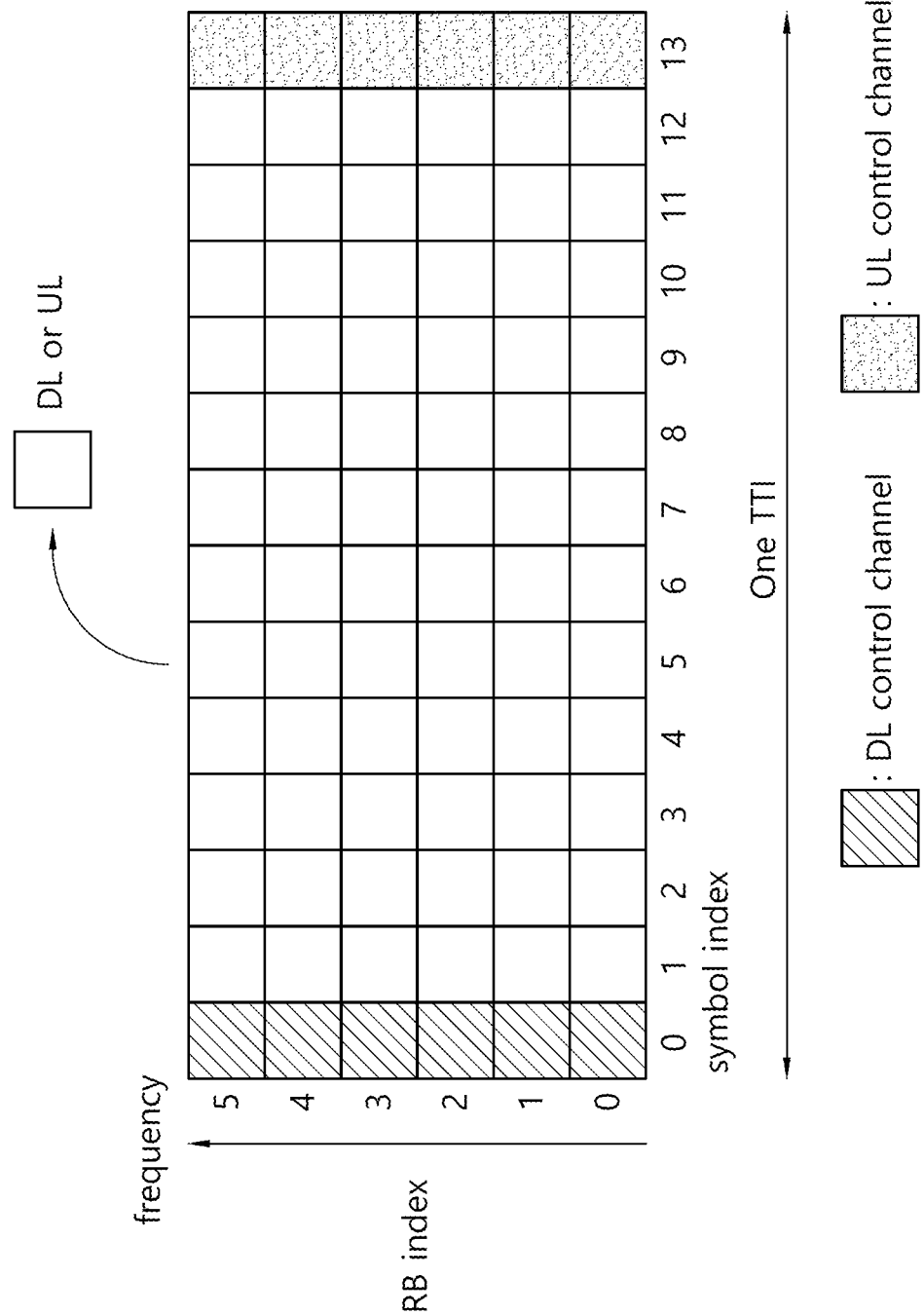
FIG. 10 illustrates an example of subframe types of 3GPP NR.

FIG. 10 illustrates an example of subframe types of NR.

A transmission time interval (TTI) shown in FIG. 10 may also be referred to as a new RAT (NR). A subframe (or slot) of FIG. 10 may be used in a TDD system in a new RAT (or NR) in order to minimize data transmission latency. As shown in FIG. 10, just as the current subframe, a subframe (or slot) includes 14 symbols. Symbols located in a front part of the subframe (or slot) may be used for a DL control channel, and symbols located in a rear part of the subframe (or slot) a UL data transmission. According to the above-described subframe (or slot) structure, the downlink transmission and the uplink transmission may be sequentially performed in one subframe (or slot). Therefore, downlink data may be received in the subframe (or slot) and an uplink acknowledgement response (ACK/NACK) may be transmitted from the corresponding subframe (or slot). The above-described subframe (r slot) may also be referred to as a self-contained subframe (or slot). Using the above-described subframe (or slot) structure is advantageous in that it is capable of reducing the time that is consumed for re-transmitting data having reception error, thereby minimizing the final data transmission latency time (or waiting time). In the above-described self-contained subframe (or slot) structure, a time gap may be required during a process of shifting from a Transmission mode to a Reception mode or shifting from a Reception mode to a transmission mode. For this, in the above-described subframe structure, when shifting from a DL to a UL, part of the OFDM symbols may be configured as a Guard Period (GP).

<Support of Diverse Numerology>

In the next generation system, with the evolution of the wireless communication technology, diverse numerology may be provided to a user device (or user equipment (UE)).

Herein, the numerology may be defined by a cycle prefix (CP) length and Subcarrier Spacing. One cell may provide multiple numerologies to the UE. When the index of a numerology is indicated as μ, each subcarrier spacing and the respective CP length are as shown below in the following table.

TABLE 11

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In case of a normal CP, when the index of a numerology is indicated as μ, a number of OFDM symbols per slot (Nslotsymb), a number of slots per frame (Nframe,μslot), and a number of slots per subframe (Nsubframe,μslot) are as shown below in the following table.

TABLE 12

| μ | $N^{slot}_{symb}$ | $N^{frame, \mu}_{slot}$ | $N^{subframe, \mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In case of an extended CP, when the index of a numerology is indicated as μ, a number of OFDM symbols per slot (Nslotsymb), a number of slots per frame (Nframe,μslot), and a number of slots per subframe (Nsubframe,μslot) are as shown below in the following table.

TABLE 13

| μ | $N^{slot}_{symb}$ | $N^{frame, \mu}_{slot}$ | $N^{subframe, \mu}_{slot}$ |
|---|---|---|---|
| 2 | 12 | 40 | 4 |

Meanwhile, in the next generation mobile communication, each symbol within a symbol may be used for a downlink or for an uplink, as shown below in the following table. In the table show below, the uplink is indicated as U, and the downlink is indicated as D. In the following table, X represents a symbol that may be flexibly used for the uplink or the downlink.

TABLE 14

| For-mat | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | X | X | X | X | X |
| 7 | D | D | D | D | D | D | D | X | X | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | D | X | X | X | X | X | X | U | U |
| 45 | D | D | D | D | D | D | X | U | U | U | U | U | U | U |
| 46 | D | D | D | D | D | D | X | D | D | D | D | D | D | X |
| 47 | D | D | D | D | X | D | D | D | D | D | D | D | X | X |
| 48 | D | D | X | X | X | X | D | X | X | X | X | X | X | X |
| 49 | D | X | X | X | X | X | D | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | X | U | D | D | D | D | D | X | X | U |
| 55 | D | D | X | U | U | U | D | X | U | U | U | U | U | U |
| 56 | D | X | U | U | U | U | D | X | U | U | U | U | U | U |
| 57 | D | D | D | D | X | U | D | D | D | D | X | X | X | U |
| 58 | D | D | X | X | U | U | D | D | X | X | U | U | U | U |
| 59 | D | X | X | U | U | U | D | X | X | U | U | U | U | U |
| 60 | D | X | X | X | U | U | D | X | X | X | U | U | U | U |
| 61 | D | D | X | X | X | U | D | D | X | X | X | U | U | U |

<UE-to-UE Coexistence Requirements>
The following Table 15 shows operating frequencies' range of Band 29 and Band 71.

TABLE 15

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 29 | N/A | 717 MHz-728 MHz | FDD |
| 71 | 663 MHz-698 MHz | 617 MHz-652 MHz | FDD |

As shown in Table 15 and FIG. 11, the frequency gap between the highest frequency (698 MHz) of Band 71 and the lowest frequency (717 MHz) of Band 29 is just 19 MHz.

Herein, Band 29 is an operating band 29 defined for E-UTRA and Band 71 is an operating band 71 defined for E-UTRA. Also, the Band 71 may correspond to operating band n71 which is defined for NR. The operating band n71 has the same frequency ranges with The Band 71. Hereinafter, Band 71 corresponds to either E-UTRA operating Band 71 or NR operating Band n71 and Band 29 corresponds to either E-UTRA operating Band 29.

Figure 11A:
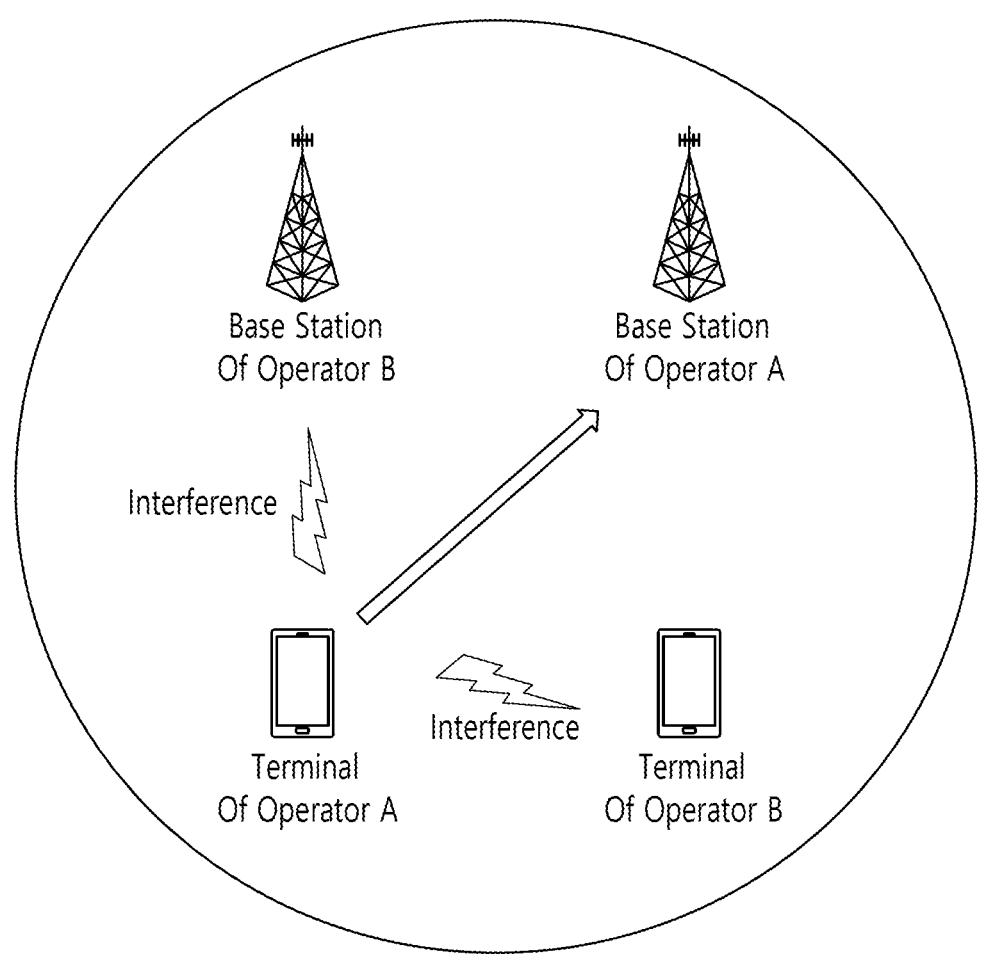
FIG. 11A illustrates an exemplary situation of spurious emission to facilitate an understanding for embodiments of the present specification.
Figure 11B:
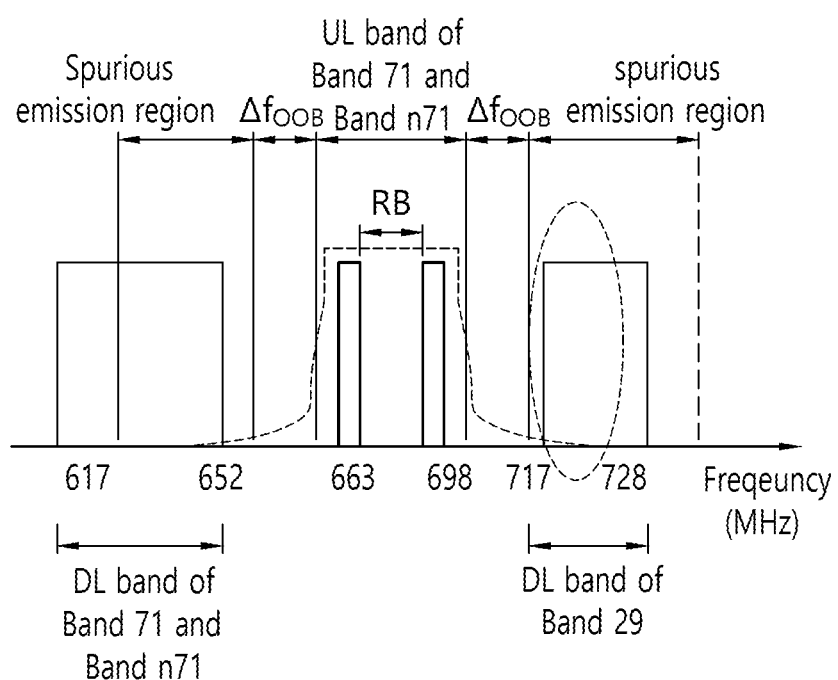
FIG. 11B illustrates an exemplary situation of spurious emission of Band 71 to Band 29 in frequency domain to facilitate an understanding for embodiments of the present specification.

FIG. 11A illustrates an exemplary situation of spurious emission to facilitate an understanding for embodiments of the present specification. FIG. 11B illustrates an exemplary situation of spurious emission of Band 71 to Band 29 in frequency domain to facilitate an understanding for embodiments of the present specification.

As can be seen from FIG. 11A and FIG. 11B, it is assumed that an operator A is providing a service in such a manner that 663 MHz~698 MHz is assigned to an uplink and 617 MHz~652 MHz is assigned to a downlink in the operating band 71 shown in Table 15, and an operator B is providing a service in such a manner that 717 MHz~728 MHz is assigned to a downlink in the operating band 29 shown in Table 15.

In such a situation, if the operator A and the operator B are simultaneously providing a service in a specific region as shown in FIG. 11A, when a terminal of the operator A performs transmission through the uplink band, i.e., the band of 663 MHz~698 MHz, spurious emission occurs, and thus an interference occurs in a band of the operator B, i.e., 717 MHz~728 MHz. As such, unwanted emission occurs in adjacent bands.

Further, as shown in FIG. 11B, the previous UE-to-UE requirements do not consider close proximity (refer to a circle in FIG. 11B) of frequencies between the uplink frequency of Band 71 (or NR Band n71) and some received frequencies lower 700 MHz frequencies bands such as Band 29 and Band 71.

Thus, there is a need to consider the close proximity of frequencies between the uplink frequency of Band 71 (or NR Band n71) and some received frequencies lower 700 MHz frequencies bands and to suggest new UE-to-UE requirements for Band 71 UE and NR Band n71 UE.

The following Table 16 shows previously specified UE-to-UE coexistence requirements according to E-UTRA Band 71 in 3GPP Technical Specification (TS) 36.101.

TABLE 16

| | | Spurious emission | | |
|---|---|---|---|---|
| E-UTRA band | Protected band | Frequency range (MHz) | Maximum Level (dBm) | MBW (MHz) |
| 71 | E-UTRA Band 4, 5, 12, 13, 14, 17, 24, 26, 29, 30, 48, 66, 71 | $F_{DL\_low}$-$F_{DL\_high}$ | −50 | 1 |
| | E-UTRA Band 2, 25, 41, 70 | $F_{DL\_low}$-$F_{DL\_high}$ | −50 | 1 |
| | E-UTRA Band 71 | $F_{DL\_low}$-$F_{DL\_high}$ | −50 | 1 |

The following Table 17 shows previously specified UE-to-UE coexistence requirements according to NR band n71 in 3GPP Technical Specification (TS) 38.101-1.

TABLE 17

| | | Spurious emission | | |
|---|---|---|---|---|
| NR band | Protected band | Frequency range (MHz) | Maximum Level (dBm) | MBW (MHz) |
| 71 | NR Bands n5, n66 E-UTRA Bands 4, 12, 13, 14, 17, 24, 26, 29, 30, 48 | $F_{DL\_low}$-$F_{DL\_high}$ | −50 | 1 |
| | NR Bands n2, n41, n70 | $F_{DL\_low}$-$F_{DL\_high}$ | −50 | 1 |
| | E-UTRA Band 25 NR Bands n71 | $F_{DL\_low}$-$F_{DL\_high}$ | −50 | 1 |

According to the table 16 and table 17, previous UE-to-UE coexistence requirements defined that the maximum level of spurious emission to protect E-UTRA band 29 as −50 dBm.

Figure 12:
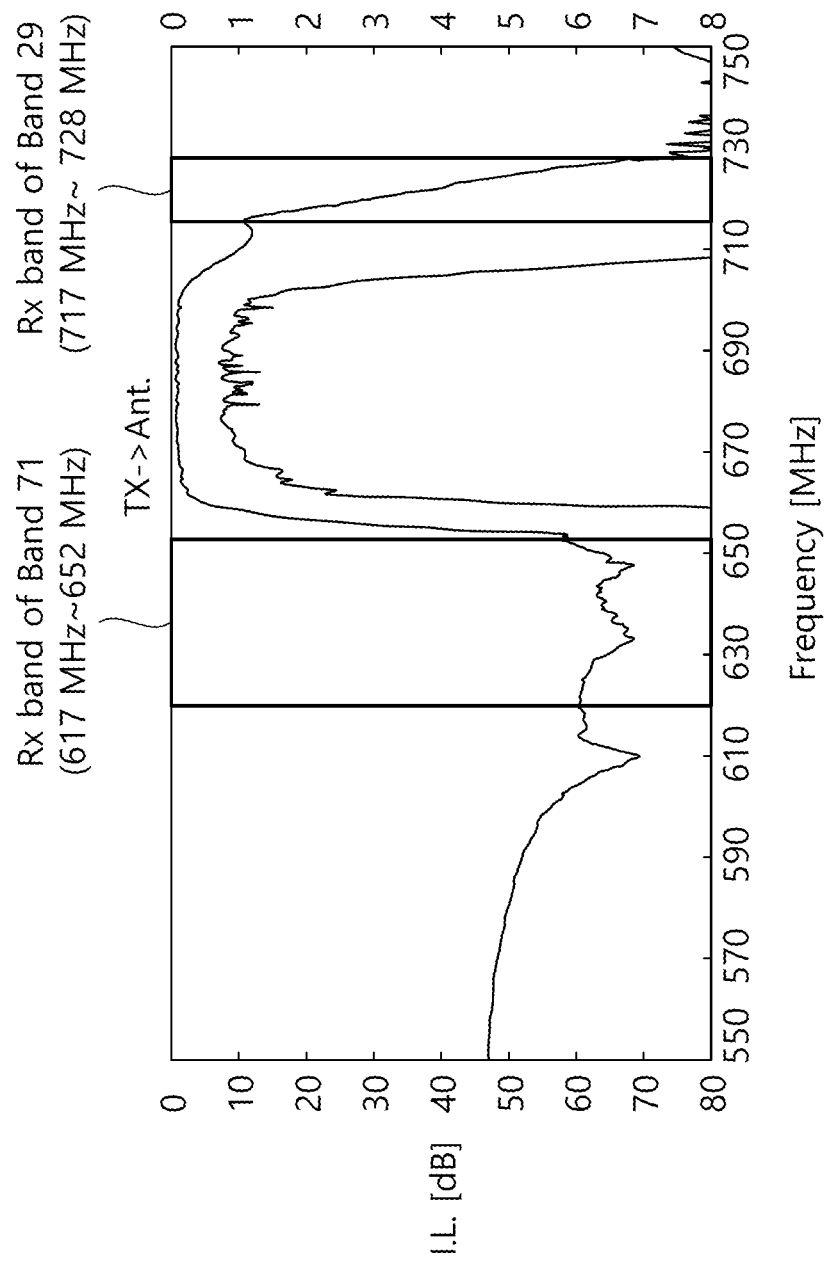
FIG. 12 illustrates attenuation characteristics of Band 71 duplexer.

FIG. 12 illustrates attenuation characteristics of the Band 71 duplexer. The following Table 18 shows an example of Band 71 (hereinafter, Band 71 corresponds to E-UTRA Band 71 or NR Band n71) duplexer characteristics to protect E-UTRA Band 29.

TABLE 18

| | | Characteristics (−20 to +85 deg. C.) | | | | |
|---|---|---|---|---|---|---|
| Tx→ANT. | | min. | typ. | max. | Unit | Note |
| Absolute Attenuation | 608 to 614 MHz | 50 | 59 | | dB | Channel 37, radio astronomy |
| | 617 to 652 MHz | 45 | 58 | | dB | Attenuation in Rx band |
| | 717 to 728 MHz | 9.0 | 15.0 | | dB | Band 29 Rx |
| | 717 to 728 MHz | 9.0 | 15.0 | | dB | Band 29 Rx, −30° C. to +25° C. |
| | 717 to 728 MHz | 10 | 15 | | dB | Band 29 Rx, +25° C. to +85° C. |
| | 717 to 729 MHz | 10 | 38 | | dB | Channel 56 |

I.L. of FIG. 12 is Insertion Loss. Absolute attenuation of Table 18 is the sum of insertion loss and scale reading. Absolute attenuation may be defined as dB and describe the absolute attenuation at a given frequency.

The isolation level between Tx band and Rx band of Band 71 is tight (only 11 MHz). The estimated emission rejection level at Band 29 (hereinafter, Band 29 corresponds to E-UTRA operating band, Band 29) is about minimum 9 dB in Rx band of Band 29 (or lower 700 MHz, for example, 717 MHz to 728 MHz) as shown in FIG. 12 and Table 18 which level is quite relaxed, compare to the rejection level with minimum 45 dB at lower 600 MHz frequency (for example, 617 MHzC to 652 MHz).

That is, the Band 71 duplexer is optimized to protect band 71 Rx band which is located in lower 600 MHz and the frequency gap between uplink band and downlink band of Band 71 is just 11 MHz. Due to the optimization of the Band 71 duplexer, minimum value of absolute attenuation is 45 dB and typical value of absolute attenuation is 58 in Rx band of Band 71 (617 MHz to 652 MHz) as shown in FIG. 12 and Table 18.

On the other hand, because of the optimization of the Band 71 duplexer to protect Rx band of Band 71, the Band 71 duplexer's performance for protecting Rx band of Band 29 is limited. In detail, minimum value of absolute attenuation is 9 dB and typical value of absolute attenuation is 15 dB as shown in FIG. 12 and Table 18. Thus, Band 71 UE's uplink signal transmission causes spurious emission which can be interference to Band 29 UE.

However, the previous UE-to-UE coexistence requirements according to Table 16 and Table 17 with −50 dBm/MHz (maximum level of spurious emission) are applied to protect both of Rx band of own Band 71 and Band 29.

According to Table 16, 17 and 18 and FIG. 12, the previous UE-to-UE coexistence requirements in Table 16 and 17 with −50 dBm/MHz to protect Band 29 cannot be satisfied because of the real filter performance for the Band 71 duplexer, as shown in FIG. 12.

Thus, to determine implementable UE-to-UE coexistence requirements, there is a need to measure emission levels at victim frequency range according to the allocated RB position and RB length in Band 71 UE and to consider performance of the Band 71 duplexer.

Figure 13:
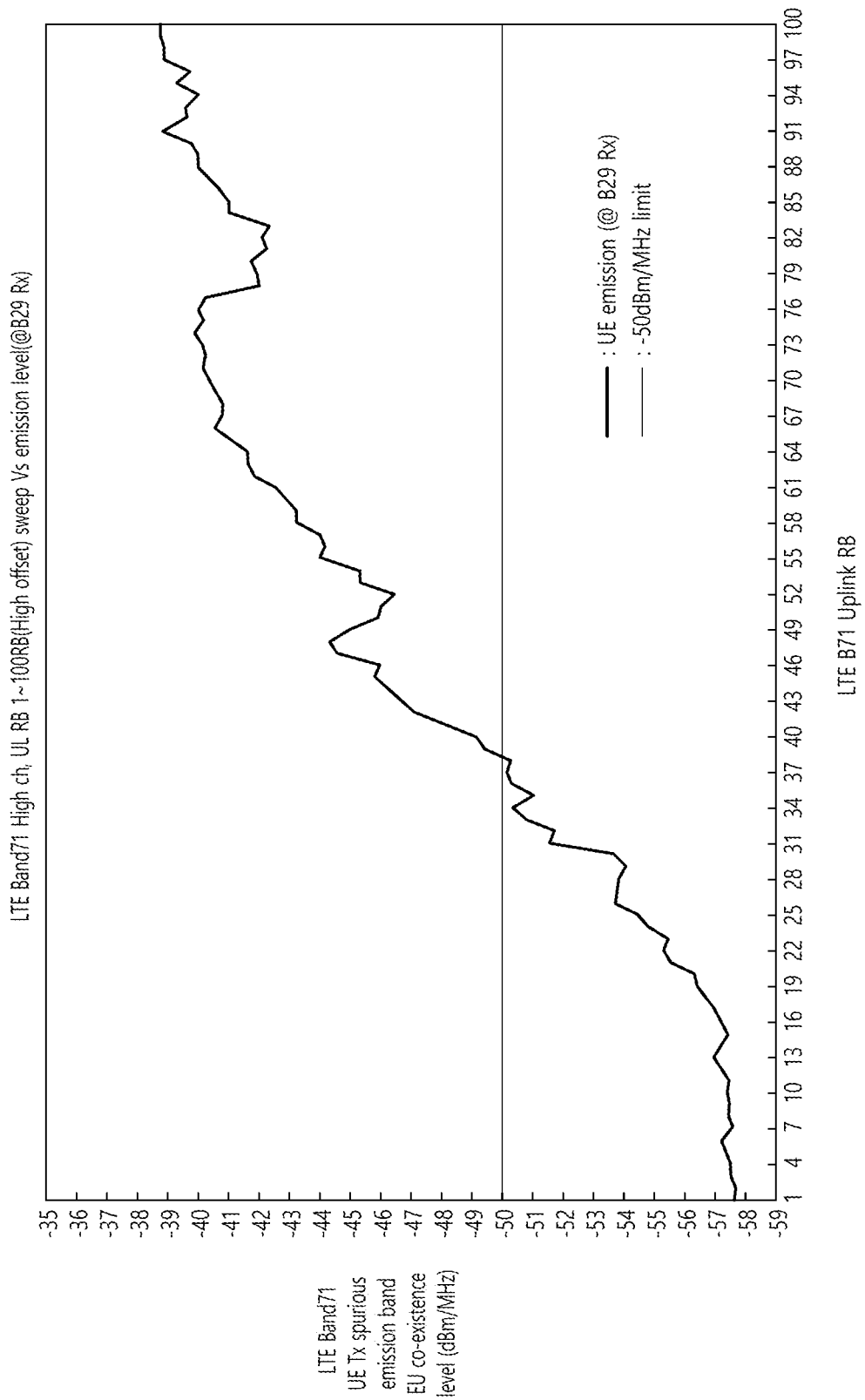
FIG. 13 illustrates a measurement result of emission levels from Band 71 UE at Rx band of Band 29.

FIG. 13 illustrates a measurement result of emission levels from Band 71 UE at Rx band of Band 29.

FIG. 13 shows measured emission levels at victim frequency range (Rx band of Band 29) according to the allocated RB position and RB length in Band 71 UE. Specifically, FIG. 13 shows the measurement result of emission levels at Rx band of Band 29 according to the allocated RB lengths at upper edge in Tx band (uplink band) of Band 71.

−50 dBm/MHz limit, which is the maximum level of spurious emission, is drawn in FIG. 13. According to FIG. 18, the −50 dBm/MHz limit only covers emission level under RB length 39. Thus, the −50 dBm/MHz limit is restrictive limit for the maximum level of spurious emission to protect Rx band of Band 29.

The following Table 19 shows expected emission levels at Band 29 for Band 71 UE according to the Radio Access Technology (RAT) and allocated uplink RB size.

TABLE 19

| LTE(SC-FDMA, QPSK) | | | NR(CP-OFDM, QPSK, SCS = 15 KHz) | | |
|---|---|---|---|---|---|
| LTE MPR | UL RB | UE Tx emission (@B29 Rx) [dBm/MHz] | NR MPR | UL RB | UE Tx emission (@B29 Rx) [dBm/MHz] |
| MPR 1 dB | 100 RB | −38.73 | MPR 3 dB | 106 RB | −38.00 |
| | 85 RB | −40.05 | | 89 RB | −40.00 |
| | 75 RB | −40.37 | | 79 RB | −40.07 |
| | 65 RB | 42.08 | | 68 RB | −41.75 |
| | 50 RB | −46.30 | | 52 RB | −46.04 |
| | 25 RB | −54.39 | | 25 RB | −53.86 |

As shown in Table 19, 1 dB MPR may be applied to LTE Band 71 UE. UE Tx emission of Table 19 shows UE Tx emission levels at Rx Band of Band 29 when corresponding number of RBs are allocated for uplink transmission. For example, if 100 RB is allocated to the LTE Band 71 UE for UL transmission, expected Tx emission level at Rx band of Band 29 is −38.73 dBm/MHz. If 50 RB is allocated to the LTE Band 71 UE for UL transmission, expected Tx emission level at Rx band of Band 29 is −46.30 dBm/MHz.

As shown in Table 19, 3 dB MPR may be applied to NR Band n71 UE. UE Tx emission of Table 19 shows UE Tx emission levels at Rx Band of Band 29 when corresponding number of RBs are allocated for uplink transmission. For example, if 106 RB is allocated to the NR Band n71 UE for UL transmission, expected Tx emission level at Rx band of Band 29 is −38.0 dBm/MHz. If 52 RB is allocated to the NR Band n71 UE for UL transmission, expected Tx emission level at Rx band of Band 29 is −46.04 dBm/MHz.

Based on the Table 19, the present specifications suggests two proposals (embodiments) of protection level for both E-UTRA Band 71 UE and NR Band n71 UE to protect Band 29 UE. 1) Proposal 1 (first embodiment) is setting −40 dBm/MHz for protection level with RB restriction. 2) Proposal 2 (second embodiment) is setting −38 dBm/MHz for protection level without RB restriction.

The following Table 20 shows an example of previous UE-to-UE coexistence protection levels in 3GPP TS 36.101.

TABLE 20

| | | Spurious emission | | | |
|---|---|---|---|---|---|
| E-UTRA Band | Protected band | Frequency range (MHz) | Maximum Level (dBm) | MBW (MHz) | Gap between aggressor UE and victim UE |
| 1 | E-UTRA Band 1, 5, 7, 8, 11, 18, 19, 20, 21, 22, 26, 27, 28, 31, 32, 38, 40, 41, 42, 43, 44, 45, 50, 51, 65, 67, 68, 69, 72, 74, 75, 76 | $F_{DL\_low}$-$F_{DL\_high}$ | −50 | 1 | |

TABLE 20-continued

<table>
<tr><th colspan="6">Spurious emission</th></tr>
<tr><th>E-UTRA Band</th><th>Protected band</th><th>Frequency range (MHz)</th><th>Maximum Level (dBm)</th><th>MBW (MHz)</th><th>Gap between aggressor UE and victim UE</th></tr>
<tr><td></td><td>E-UTRA Band 3, 34</td><td>$F_{DL\_low}$-$F_{DL\_high}$</td><td>−50</td><td>1</td><td></td></tr>
<tr><td></td><td>Frequency range</td><td>1880-1895</td><td>−40</td><td>1</td><td>25 MHz Gap</td></tr>
<tr><td>5</td><td>E-UTRA Band 1, 2, 3, 4, 5, 7, 8, 10, 12, 13, 14, 17, 24, 25, 28, 29, 30, 31, 34, 38, 40, 42, 43, 45, 48, 50, 51, 65, 66, 70, 71, 74</td><td>$F_{DL\_low}$-$F_{DL\_high}$</td><td>−50</td><td>1</td><td></td></tr>
<tr><td></td><td>E-UTRA Band 26</td><td>859-869</td><td>−27</td><td>1</td><td></td></tr>
<tr><td></td><td>E-UTRA Band 41</td><td>$F_{DL\_low}$-$F_{DL\_high}$</td><td>−50</td><td>1</td><td></td></tr>
<tr><td></td><td>E-UTRA Band 18, 19</td><td>$F_{DL\_low}$-$F_{DL\_high}$</td><td>−40</td><td>1</td><td>11 MHz Gap<br>26 MHz Gap</td></tr>
<tr><td>7</td><td>E-UTRA Band 1, 2, 3, 4, 5, 7, 8, 10, 12, 13, 14, 17, 20, 22, 26, 27, 28, 29, 30, 31, 32, 33, 34, 40, 42, 43, 50, 51, 65, 66, 67, 68, 72, 74, 75, 76</td><td>$F_{DL\_low}$-$F_{DL\_high}$</td><td>−50</td><td>1</td><td></td></tr>
<tr><td></td><td>Frequency range</td><td>2570-2575</td><td>+1.6</td><td>5</td><td></td></tr>
<tr><td></td><td>Frequency range</td><td>2575-2595</td><td>−15.5</td><td>5</td><td></td></tr>
<tr><td></td><td>Frequency range</td><td>2595-2620</td><td>−40</td><td>1</td><td>25 MHz Gap</td></tr>
<tr><td>8</td><td>E-UTRA Band 1, 20, 28, 31, 32, 33, 34, 38, 39, 40, 45, 50, 51, 65, 67, 68, 69, 72, 74, 75, 76</td><td>$F_{DL\_low}$-$F_{DL\_high}$</td><td>−50</td><td>1</td><td></td></tr>
<tr><td></td><td>E-UTRA band 3, 7, 22, 41, 42, 43</td><td>$F_{DL\_low}$-$F_{DL\_high}$</td><td>−50</td><td>1</td><td></td></tr>
<tr><td></td><td>E-UTRA Band 8</td><td>$F_{DL\_low}$-$F_{DL\_high}$</td><td>−50</td><td>1</td><td></td></tr>
<tr><td></td><td>E-UTRA Band 11, 21</td><td>$F_{DL\_low}$-$F_{DL\_high}$</td><td>−50</td><td>1</td><td></td></tr>
<tr><td></td><td>Frequency range</td><td>860-890</td><td>−40</td><td>1</td><td>10 MHz Gap</td></tr>
<tr><td>18</td><td>E-UTRA Band 1, 11, 21, 34, 42, 65</td><td>$F_{DL\_low}$-$F_{DL\_high}$</td><td>−50</td><td>1</td><td></td></tr>
<tr><td></td><td>Frequency range</td><td>758-799</td><td>−50</td><td>1</td><td></td></tr>
<tr><td></td><td>Frequency range</td><td>799-803</td><td>−40</td><td>1</td><td>12 MHz Gap</td></tr>
<tr><td>28</td><td>E-UTRA Band 1, 4, 10, 22, 42, 43, 50, 51, 65, 74, 75, 76</td><td>$F_{DL\_low}$-$F_{DL\_high}$</td><td>−50</td><td>1</td><td></td></tr>
<tr><td></td><td>E-UTRA Band 1</td><td>$F_{DL\_low}$-$F_{DL\_high}$</td><td>−50</td><td>1</td><td></td></tr>
<tr><td></td><td>E-UTRA Band 2, 3, 5, 7, 8, 18, 19, 20, 25, 26, 27, 31, 34, 38, 40, 41, 66, 72</td><td>$F_{DL\_low}$-$F_{DL\_high}$</td><td>−50</td><td>1</td><td></td></tr>
<tr><td></td><td>E-UTRA Band 11, 21</td><td>$F_{DL\_low}$-$F_{DL\_high}$</td><td>−50</td><td>1</td><td></td></tr>
<tr><td></td><td>Frequency range</td><td>470-694</td><td>−42</td><td>8</td><td>−33 dBm/MHz w/9 MHz Gap</td></tr>
<tr><td></td><td>Frequency range</td><td>470-710</td><td>−26.2</td><td>6</td><td></td></tr>
<tr><td></td><td>Frequency range</td><td>662-694</td><td>−26.2</td><td>6</td><td></td></tr>
<tr><td></td><td>Frequency range</td><td>758-773</td><td>−32</td><td>1</td><td>10 MHz Gap</td></tr>
</table>

Table 20 has been reviewed as a reference for deciding the protection level (maximum level of spurious emission) to protect Band 29 UE.

According to Table 20, the following Result is derived.

Result: The protection level with −40 dBm/MHz are applied to protect victim operating bands with frequency gap within 10 MHz to 26 MHz away.

For example, according to Table 20, if UE configure a transceiver of UE to use an operating Band 5 and if E-UTRA Band 18, 19 are to be protected from the uplink signal sent on uplink band of Band 5, maximum level of spurious emission is limited to −40 dBm/MHz. For this example, the measurement bandwidth (MBW) is 1 dBm and the Gap between downlink band of Band 18, 19 and uplink band of Band 5 are 11 MHz and 26 MHz each.

Proposal 1 (first embodiment) is defined based on the Result, Table 19 and FIG. 13. Proposal 1 (first embodiment) is drawn in FIG. 14 together with the measurement result of FIG. 13.

Figure 14:
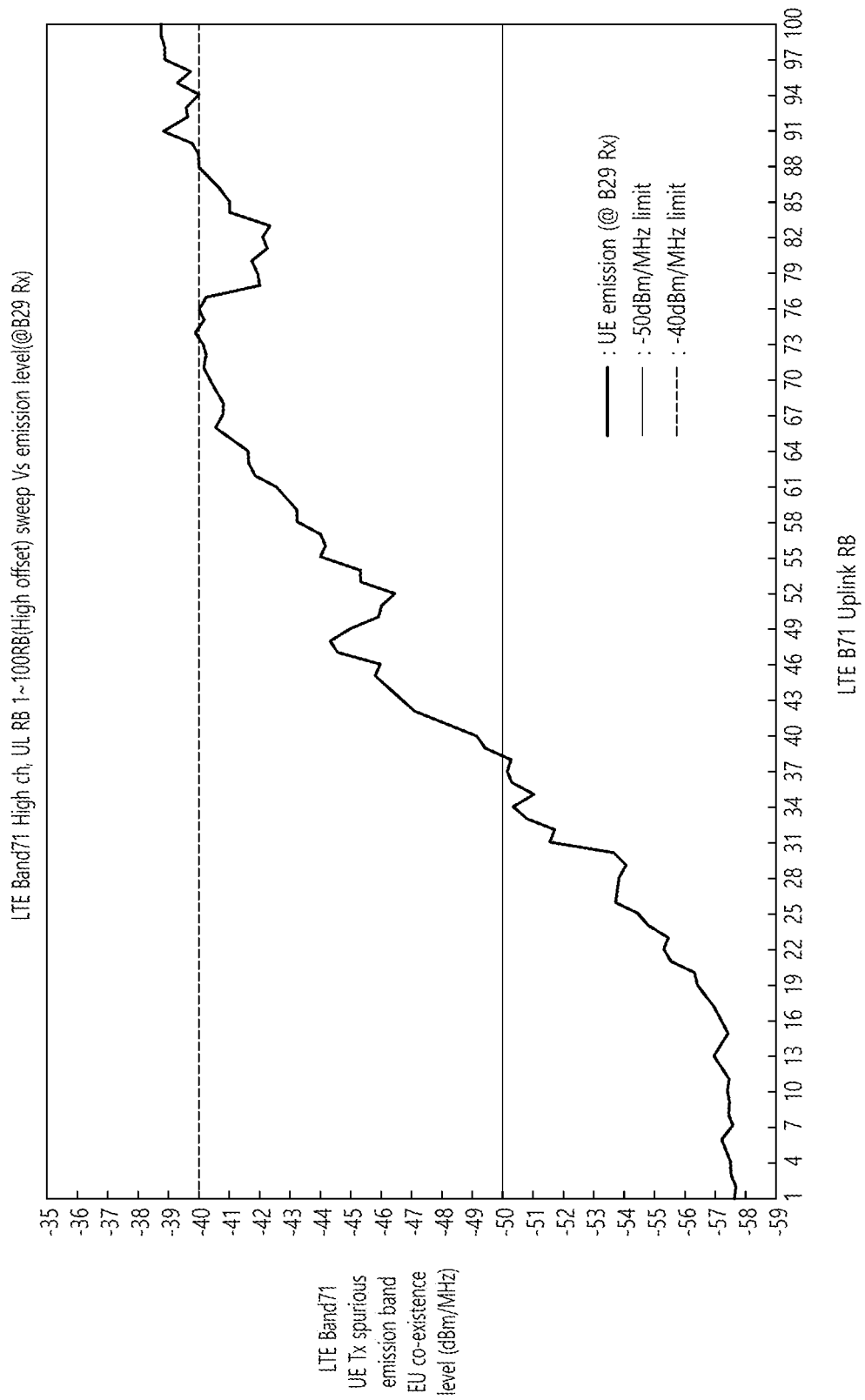
FIG. 14 illustrates a first proposed spurious emission level from Band 71 UE at Rx band of Band 29.

FIG. 14 illustrates a first proposed spurious emission level from Band 71 UE at Rx band of Band 29.

As mentioned above, Proposal 1 (first embodiment) is setting −40 dBm/MHz for the protection level with RB restriction. The horizontal line with gray color is the protection level. Based on FIG. 14, RB restriction for Proposal 1 (first embodiment) may be set. For example, the RB restriction may be 89 RB length or 65 RB length.

Proposal 2 (second embodiment) is defined based on the Result, Table 19 and FIG. 13. Proposal 2 (second embodiment) is drawn in FIG. 15 together with the measurement result of FIG. 13.

Figure 15:
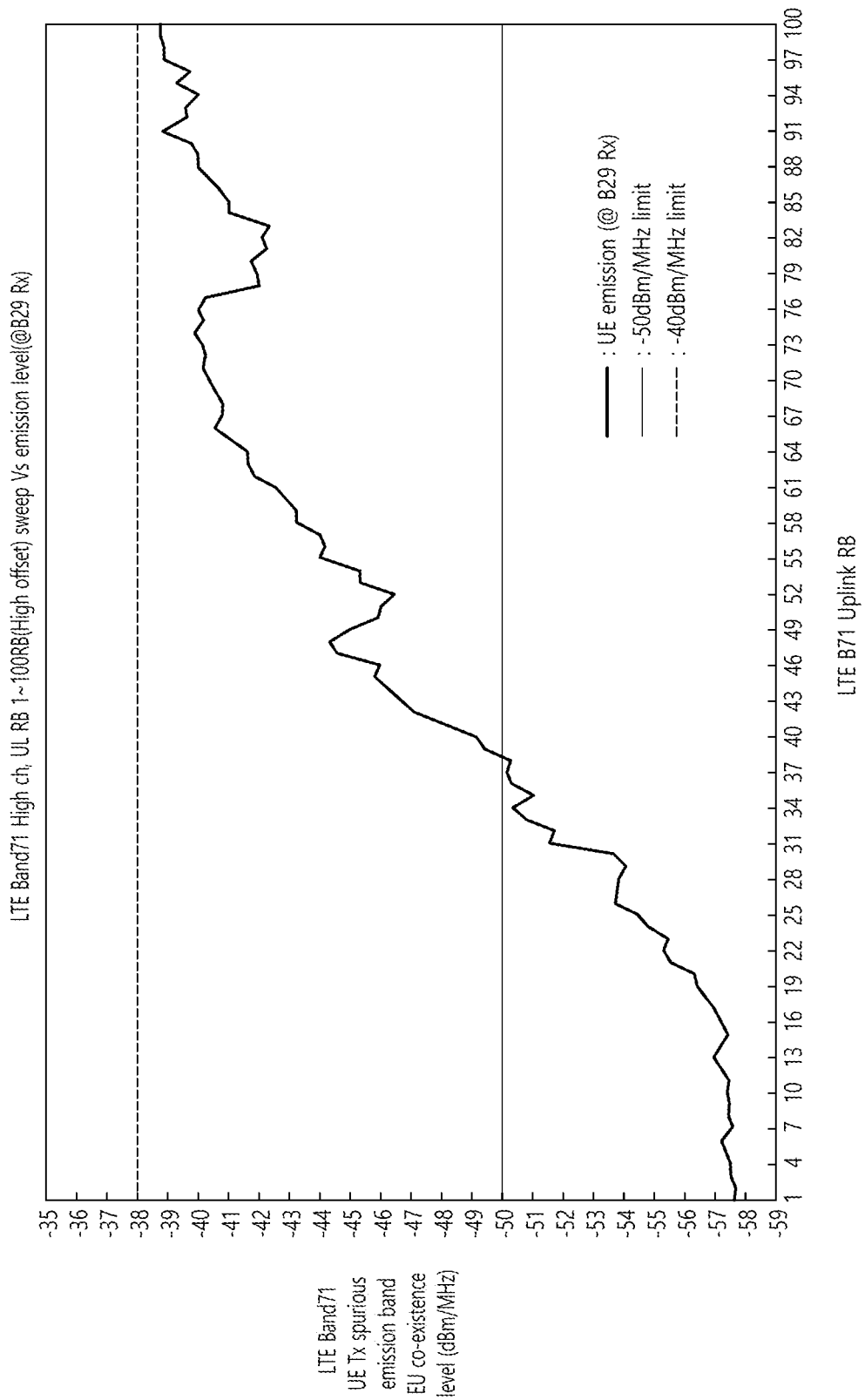
FIG. 15 illustrates a second proposed spurious emission level from Band 71 UE at Rx band of Band 29.

FIG. 15 illustrates a second proposed spurious emission level from Band 71 UE at Rx band of Band 29.

As mentioned above, Proposal 2 (second embodiment) is setting −38 dBm/MHz for the protection level without RB restriction. The horizontal line with gray color is the protection level. Based on FIG. 15, the protection level of Proposal 2 (second embodiment) covers emission levels with whole RB lengths. Thus, there is no need to set any RB restriction to Proposal 2 (second embodiment).

UE-to-UE coexistence requirements based on Proposal 1 (first embodiment) or Proposal 2 (second embodiment) are implementable requirements because it has determined based on measurements of emission levels at victim frequency range in Band 71 UE and consideration of performance of the Band 71 duplexer.

Compared to Proposal 1 (first embodiment), Proposal 2 (second embodiment) may be preferable because Proposal 2 (second embodiment) has no restriction for allocating RBs. For example, if Proposal 1 (first embodiment) is applied as shown in FIG. 14, only RBs less than 89 RB are allocated to uplink transmission for Band 71 UE. In contrast, Uplink transmission for Proposal 2 (second embodiment) can be more efficient because all of RBs can be allocated to Band 71 UE. That is, UE-to-UE coexistence requirements based on Proposal 2 (second embodiment) is implementable without any further restrictions.

Also, Band 29 should be protected by Band 71 UE's signal transmission in the frequency ranges less than FOOB range with Note 1, which is described below.

Note 1: These requirements (Proposals (embodiments)) also apply for the frequency ranges that are less than FOOB (MHz) in Table 21 and Table 22 from the edge of the channel bandwidth.

The following Table 21 shows an example of boundary between E-UTRA out of band and spurious emission domain

TABLE 21

| | Channel bandwidth | | | | | |
|---|---|---|---|---|---|---|
| | 1.4 MHz | 3.0 MHz | 5 MHz | 10 MHz | 15 MHz | 20 MHz |
| OOB boundary FOOB (MHz) | 2.8 | 6 | 10 | 15 | 20 | 25 |

The following Table 22 shows an example of boundary between E-UTRA out of band and spurious emission domain for intra-band contiguous carrier aggregation.

TABLE 22

| CA Bandwidth Class | OOB boundary FOOB (MHz) |
|---|---|
| A | Table 22 |
| B | BWChannel_CA + 5 |
| C | BWChannel_CA + 5 |

So Note 1, which was already considered in description related to Table 19 and FIG. 13, may be added to either Proposal 1 (first embodiment) or Proposal 2 (second embodiment).

Thus, Proposal 1 (first embodiment) may be further defined as either i) setting −40 dBm/MHz for protection level with RB restriction or ii) setting −40 dBm/MHz for protection level with RB restriction and Note 15.

Also, Proposal 2 (second embodiment) may be further defined as either i) setting −38 dBm/MHz for protection level without RB restriction or ii) setting −38 dBm/MHz for protection level with RB restriction and Note 15.

Figure 16:
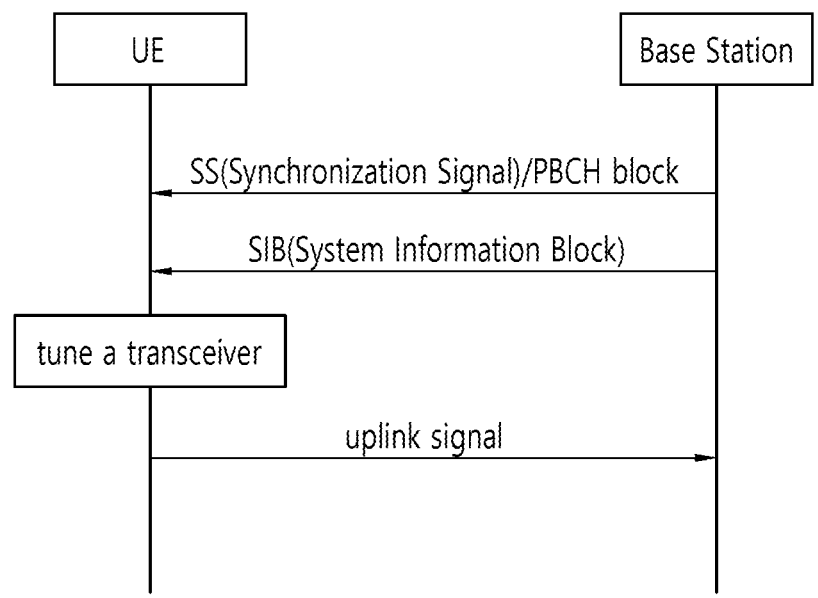
FIG. 16 illustrates an operation of UE according to embodiments of the present invention.

FIG. 16 illustrates an operation of UE according to embodiments of the present invention.

As shown in FIG. 16, a BS of the operator A transmits an SS(Synchronization Signal)/PBCH block and an SIB (system information block).

In the time domain, an SS/PBCH block consists of 4 OFDM symbols, numbered in increasing order from 0 to 3 within the SS/PBCH block, where PSS, SSS, and PBCH with associated DM-RS are mapped to symbols.

The SIB may include one or more of information regarding an operating band in use among the operating bands defined for E-UTRA or NR, information regarding a UL (uplink) bandwidth, and information regarding a UL carrier frequency. The information regarding the UL bandwidth may include information regarding the number of RBs (resource blocks).

UE tunes a transceiver based on one or more of information included in the SIB. UE configure a transceiver of UE to use an operating band 71.

Then, UE transmits an uplink signal on an uplink band of the operating band 71. If an operating band 29 is to be protected from the uplink signal, a maximum level of spurious emission is limited according to Proposal 1 (first embodiment) or Proposal 2 (second embodiment) as explained above.

For example, according to Proposal 1 (first embodiment), if the operating band 29 is to be protected from the uplink signal, a maximum level of spurious emission is limited to −40 dBm for protecting other UE using the operating band 29.

According to Proposal 2 (second embodiment), if the operating band 29 is to be protected from the uplink signal, a maximum level of spurious emission is limited to −38 dBm for protecting other UE using the operating band 29.

Figure 17:
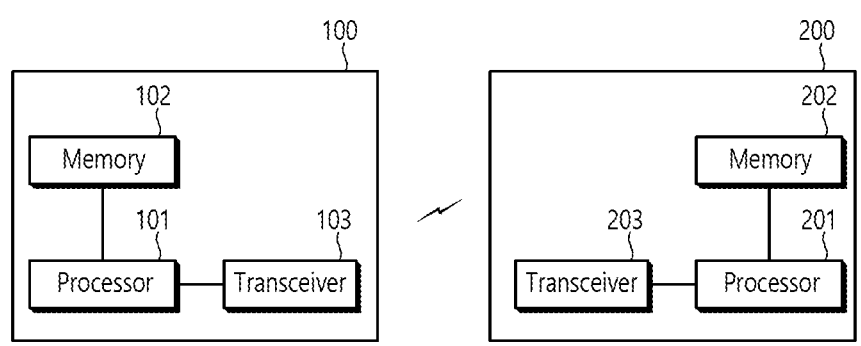
FIG. 17 illustrates a block diagram illustrating a wireless communication system according to embodiments of the present invention.

FIG. 17 illustrates a block diagram illustrating a wireless communication system according to embodiments of the present invention.

A base station 200 includes a processor 201, a memory 202, and a radio frequency (RF) unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

A wireless device 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method. An operation of the wireless 100 according to the above embodiment may be implemented by the processor 201.

A processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module (procedure, function, and the like) to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method for limiting a spurious emission in a wireless communication system, the method performed by a user equipment (UE) and comprising:

configuring a transceiver of the UE to use an operating band 71; and transmitting an uplink signal on an uplink band of the operating band 71, wherein based on an operating band 29 to be protected from the uplink signal, a maximum level of spurious emission is limited to −38 dBm for protecting at least one other UE using the operating band 29.

2. The method of claim 1, wherein the operating band 71 includes an uplink operating band of 663 MHz to 698 MHz, and wherein the operating band 29 includes a downlink operating band of 717 MHz to 728 MHz.

3. The method of claim 2, wherein the operating band 71 includes a downlink operating band of 617 MHz to 652 MHz.

4. The method of claim 1, wherein the operating band 29 is defined for an Evolved UMTS Terrestrial Radio Access (E-UTRA).

5. The method of claim 1, wherein the operating band 71 is defined for Evolved UMTS Terrestrial Radio Access (E-UTRA).

6. The method of claim 1, wherein the operating band 71 corresponds to operating band n71, which is defined for New Radio (NR).

7. The method of claim 1 further comprising, determining at least one operating band to be protected from the uplink signal among a plurality of operating bands, wherein based on the determined operating band to be protected from the uplink signal being the operating band 19, the maximum level of spurious emission is limited to −38 dBm for protecting the at least one other UE using the operating band 29.

8. A User Equipment (UE) configured to limit a spurious emission in a wireless communication system, the UE comprising:
    a transceiver;
    at least one processor; and
    at least one computer memory operably connectable to the at least one processor and storing instructions that, based on being executed by the at least one processor, perform operations comprising:
    configuring the transceiver of the UE to use an operating band 71; and
    transmitting, through the transceiver, an uplink signal on an uplink band of the operating band 71,
    wherein based on an operating band 29 to be protected from the uplink signal, a maximum level of spurious emission is limited to −38 dBm for protecting at least one other UE using the operating band 29.

9. The UE of claim 8, wherein the operating band 71 includes an uplink operating band of 663 MHz to 698 MHz, and wherein the operating band 29 includes a downlink operating band of 717 MHz to 728 MHz.

10. The UE of claim 9, wherein the operating band 71 includes a downlink operating band of 617 MHz to 652 MHz.

11. The UE of claim 8, wherein the operating band 29 is defined for an Evolved UMTS Terrestrial Radio Access (E-UTRA).

12. The UE of claim 8, wherein the operating band 71 is defined for Evolved UMTS Terrestrial Radio Access (E-UTRA).

13. The UE of claim 8, wherein the operating band 71 corresponds to operating band n71, which is defined for New Radio (NR).

14. The UE of claim 8, wherein the operations further comprise:
    determining at least one operating band to be protected from the uplink signal among a plurality of operating bands,
    wherein based on the determined operating band to be protected from the uplink signal being the operating band 19, the maximum level of spurious emission is limited to −38 dBm for protecting the at least one other UE using the operating band 29.

15. A processing apparatus configured to control a User Equipment (UE) to limit a spurious emission in a wireless communication system, the processing apparatus comprising:
    at least one processor; and
    at least one computer memory operably connectable to the at least one processor and storing instructions that, based on being executed by the at least one processor, perform operations comprising:
    configuring a transceiver of the UE to use an operating band 71; and
    transmitting, through the transceiver, an uplink signal on an uplink band of the operating band 71,
    wherein based on an operating band 29 to be protected from the uplink signal, a maximum level of spurious emission is limited to −38 dBm for protecting at least one other UE using the operating band 29.

16. The processing apparatus of claim 15, wherein the operating band 71 includes an uplink operating band of 663 MHz to 698 MHz, and wherein the operating band 29 includes a downlink operating band of 717 MHz to 728 MHz.

17. The processing apparatus of claim 16, wherein the operating band 71 includes a downlink operating band of 617 MHz to 652 MHz.

18. The processing apparatus of claim 15, wherein at least one of the operating band 29 or the operating band 71 is defined for an Evolved UMTS Terrestrial Radio Access (E-UTRA).

19. The processing apparatus of claim 15, wherein the operating band 71 corresponds to operating band n71, which is defined for New Radio (NR).

20. The processing apparatus of claim 15, wherein the operations further comprise:
    determining at least one operating band to be protected from the uplink signal among a plurality of operating bands,
    wherein based on the determined operating band to be protected from the uplink signal being the operating band 19, the maximum level of spurious emission is limited to −38 dBm for protecting the at least one other UE using the operating band 29.

* * * * *